United States Patent [19]

Kataoka et al.

[11] Patent Number: 5,037,133
[45] Date of Patent: Aug. 6, 1991

[54] PASSIVE SEAT BELT SYSTEM FOR VEHICLE

[75] Inventors: Sachiro Kataoka, Ebina; Yoichi Iizima, Tokyo; Kenro Otsuka, Zama; Takashi Nakamori, Atsugi, all of Japan

[73] Assignee: Nissan Motor Co., Ltd., Yokohama, Japan

[21] Appl. No.: 100,374

[22] Filed: Sep. 24, 1987

[30] Foreign Application Priority Data

Sep. 26, 1986 [JP] Japan .................. 61-227824

[51] Int. Cl.[5] ............................................ B60R 22/06
[52] U.S. Cl. ................................. 280/804; 180/268; 307/10.1
[58] Field of Search ..................... 280/804, 802, 803; 297/469, 473; 340/52 E; 307/10 SB, 10 R, 10.1; 180/286, 282, 271, 268

[56] References Cited

U.S. PATENT DOCUMENTS

| | | | |
|---|---|---|---|
| 4,232,885 | 11/1980 | Suzuki et al. | 297/469 |
| 4,344,502 | 8/1982 | Terabayashi | 180/268 |
| 4,394,035 | 7/1983 | Sato | 280/804 |
| 4,695,076 | 9/1987 | Hane | 280/804 |
| 4,778,200 | 10/1988 | Asano | 280/804 |
| 4,781,267 | 11/1988 | Waineo et al. | 280/804 |
| 4,790,405 | 12/1988 | Kataoka | 280/804 |

FOREIGN PATENT DOCUMENTS 56-71643 6/1981 Japan .
1583443 1/1981 United Kingdom .

Primary Examiner—Charles A. Marmor
Assistant Examiner—Karin Tyson
Attorney, Agent, or Firm—Foley & Lardner

[57] ABSTRACT

A passive seat belt system for an automotive vehicle has a webbing which takes a passenger restraining position or a passenger releasing position. Impact detecting means is provided to detect impact applied to the vehicle. Door state change detecting means is provided to detect change in closing and opening states of a vehicle door. When the change is detected, signal output regulating means selectively outputs closing and opening signals for a predetermined time. Additionally, the signal output regulating means is adapted to prohibit the closing and opening signals from being output when the impact signal is output from the impact detecting means. Webbing driving means is provided to move the webbing to the passenger restraining and releasing positions respectively in response to the closing and opening signals output from the signal output regulating means. The system allows vehicle escape in an emergency, if the door is opened.

9 Claims, 5 Drawing Sheets

PASSIVE SEAT BELT SYSTEM FOR VEHICLE

BACKGROUND OF THE INVENTION

1. Field of the Invention

The present invention relates to a passive seat belt system equipped in a vehicle such as an automotive vehicle in order to restrain the breast section of a passenger of the vehicle, and more particularly to a passive seat belt system configurated such that a webbing for restraining the passenger is driven by a webbing driving device in response to opening and closing states of a vehicle door, in which the webbing driving device is made inoperative when impact is applied to the vehicle.

2. Description of the Prior Art

A variety of passive seat belt systems have been proposed and put into practical use. A typical conventional system is disclosed in Japanese Patent Provisional Publication No. 56-71643 in which a passive seat belt system including a webbing for restraining a passenger is driven by a webbing driving means which is controlled in response to opening and closing states of a vehicle door. Impact detecting means is provided to detect impact applied to a vehicle to output an impact signal. The impact signal is maintained for a predetermined time under the action of a timer. Additionally, a driving prohibition commanding means is provided to make the webbing driving means inoperative during a predetermined time in which the impact signal is maintained by the timer. Thus, according to the above-described conventional passive seat belt system, within the predetermined time after impact is detected by the impact detecting means, the webbing driving means is made inoperative even when the vehicle door is opened, thereby preventing the webbing from being driven in the direction of releasing the passenger even in a condition in which the vehicle door is opened by impact at vehicle collision.

However, difficulties have been encountered in the conventional passive seat belt system in that the passenger cannot make an emergency vehicle escape action even upon opening of the vehicle door immediately after the impact detecting means detects impact when a sudden stop of the vehicle is made upon applying sudden brake or the like, because the conventional passive seat belt system is arranged so that the webbing driving means is necessarily made inoperative for the predetermined time under the action of a timer and the driving prohibition commanding means in response to the impact signal from the impact detecting means.

SUMMARY OF THE INVENTION

It is an object of the present invention to overcome the above-described disadvantages encountered in conventional seat belt systems.

A passive seat belt system of the present invention is comprised of a webbing for restraining a vehicle passenger. The webbing selectively takes a passenger restraining position for restraining the passenger and a releasing position for releasing the passenger from restraint. Impact detecting means is provided to detect impact of a vehicle and to output an impact signal. Door state change detecting means is provided to detect changes in the opening and closing states of a vehicle door. Signal output regulating means is provided to selectively output opening and closing signals for a predetermined time when a door state change is detected by the door state change detecting means, and to prohibit the opening and closing signals from being output when the impact signal is output from the impact detecting means. Additionally, webbing driving means is provided to move the webbing to the passenger releasing and restraining positions respectively in response to the opening and closing signals output from the signal output regulating means.

Thus, since driving of the webbing is controlled in response to a change in the opening and closing states of the door, it is unnecessary to maintain the output of the impact signal for prohibiting operation of the webbing as in the conventional arrangement. In other words, if no change is made in the opening and closing states of the door after vehicle collision, the webbing can securely restrain passenger, while the passenger can be released from restraint upon opening the vehicle door at any time including a time immediately after the vehicle collision, thereby increasing safety of the passenger in case of emergency. Furthermore, when impact is applied to the vehicle during manual or accidental change in the opening and closing states of the vehicle door so that the webbing will move, the webbing is immediately put into its inoperative position under the action of the signal output regulating means, thus solving problems associated with a multiple collision without using a timer.

DETAILED DESCRIPTION OF THE INVENTION

Figure 1:
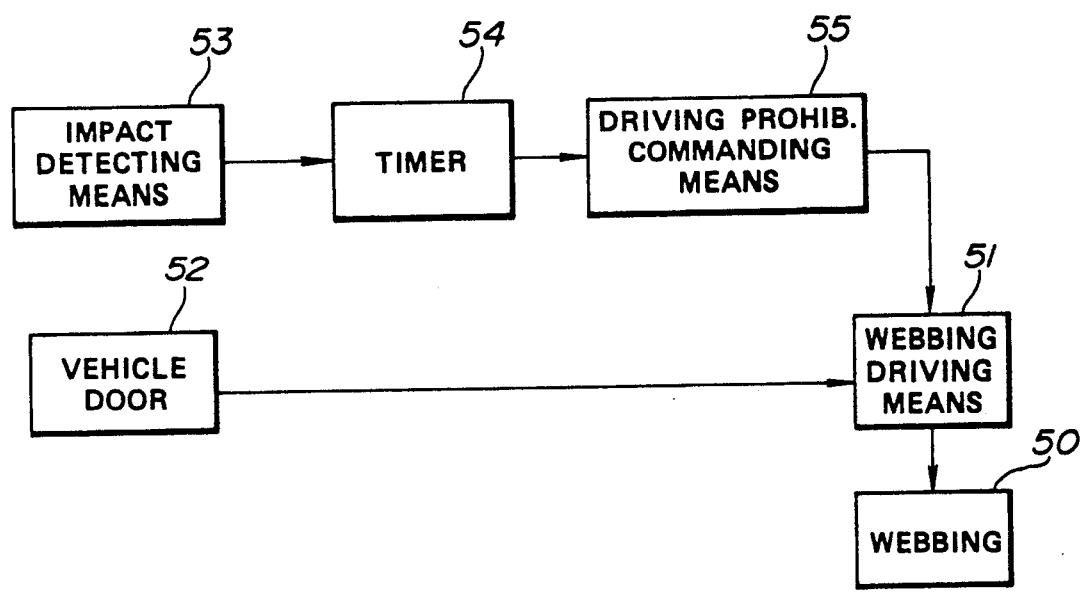
FIG. 1 is a block diagram showing the principle of a conventional passive seat belt system.
Figure 2:
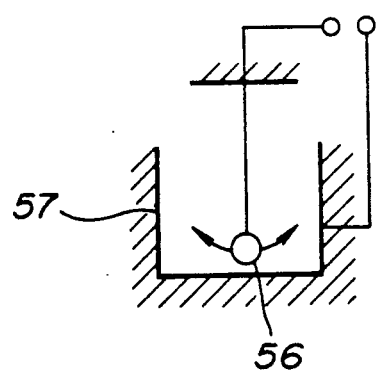
FIG. 2 is a schematic illustration of an example of an impact detecting means used in the arrangement of FIG. 1.

To facilitate understanding the present invention, a brief reference will be made to a conventional passive seat belt system as disclosed in Japanese Patent Provisional Publication No. 56-71643, depicted in FIGS. 1 and 2. Referring to FIG. 1, the conventional passive seat belt system is shown includes a webbing 50 for restraining a passenger, and webbing driving means 51 which has a webbing driving motor and is adapted to drive the motor in accordance with opening and closing signals output in response to the opening and closing states of a vehicle door 52 and with response signals from the webbing 50. An impact detecting means 53 is provided to detect impact applied to the vehicle to output an impact signal. A timer 54 is provided to maintain the impact signal from the impact detecting means 53 for a predetermined time. Additionally, driving prohibition commanding means 55 is provided to make the webbing driving means 51 inoperative during the time when the impact signal is maintained by the timer 54.

With this conventional system, during the time in which the impact signal is maintained by the timer 54, the webbing 50 is made inoperative through the webbing driving means 51 under the action of the driving prohibition commanding means 55 even when the opening signal is output in response to opening of the vehicle door 52. If no impact signal is output, the webbing 50 for restraining the passenger is moved to its passenger restraining position to restrain the passenger when the closing signal is output in response to the closing of the vehicle door 52, while the webbing 50 is moved to its passenger releasing position to release the passenger from restraint when the opening signal is output in response to opening of the vehicle door 52. The impact detecting means 53 includes, for example, a pendulum contact 56 and a stationary contact 57 and is arranged such that the contacts 56, 57 are brought into contact with each other to establish a conductive condition therebetween when impact is applied to the vehicle. Thus, if no impact is applied to the vehicle, when the vehicle door 52 is opened, the webbing 50 is adapted to release the passenger from restraint. However, within a predetermined time after impact is detected by the impact detecting means 53, the webbing 50 is made inoperative even when the vehicle door 52 is opened, thereby preventing the webbing 50 from releasing.

However, difficulties have been encountered in the above conventional passive seat belt system in that the passenger cannot make an emergency vehicle escape action even upon opening the vehicle door immediately after the impact detecting means 53 detects impact when a sudden stop of the vehicle occurs upon applying sudden brake or the like, since the conventional passive seat belt system is arranged so that the webbing driving means 51 is made inoperative for a predetermined time under the action of the timer 54 and the driving prohibition commanding means 55 in response to the impact signal from the impact detecting means 53.

Accordingly, if the timer 54 is removed, the webbing 50 is moved to its passenger releasing position immediately after a vehicle collision in which the vehicle door is inadvertently put into its opening state, thereby lowering passenger restraining ability. Additionally, this modified system is not suitable for so-called multiple collisions in which the interval between the collisions is so short that there is less time for escaping to outside the vehicle. Such difficulties in the conventional passive seat belt system arise from the fact that the webbing is controllably driven only in response to the opening and closing states of the vehicle door.

Figure 3:
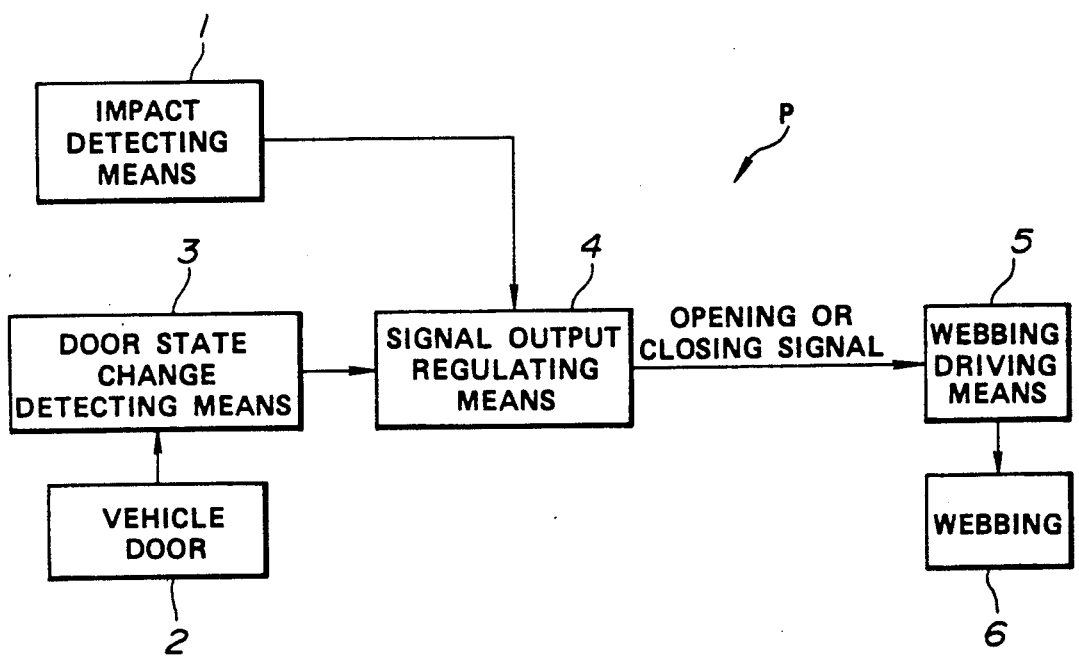
FIG. 3 is a basic block diagram showing the principle of a passive seat belt system according to the present invention.

In view of the above description of the conventional passive seat belt system, reference is now made to FIG. 3 wherein the principles of a passive seat belt system P according to the present invention is schematically illustrated. The passive seat belt system P comprises a webbing 6 for restraining a vehicle passenger, adapted to take selectively a first position (or passenger restraining position) at which the passenger is restrained and a second position (or passenger releasing position) at which the passenger is released from restraint. Impact detecting means 1 is provided to detect impact of a vehicle and to output an impact signal. Door state change detecting means 3 is provided to detect change in the opening and closing states of a vehicle door 2. Signal output regulating means 4 is provided to output selectively a first (closing) signal and a second (opening) signal for a predetermined time when a door state change is detected by the door state change detecting means 3, and to prohibit the first and second signals from being output when the impact signal is output from the impact detecting means 1. Additionally, webbing driving means 5 is provided to move the webbing to the first and second positions in response to the first and second signals, respectively, output from the signal output regulating means 4.

With the thus configurated passive seat belt system P according to the present invention, if no impact signal is output from the impact detecting means 1, when the door state change detecting means 3 detects the fact that the vehicle door 2 is changed from its closing state to its opening state, the signal output regulating means 4 outputs the opening signal for the predetermined time. Preferably, the predetermined time is long enough to move the webbing 6 from the passenger restraining position to the passenger releasing position. When the opening signal is input, the webbing driving means 5 drives the webbing 6 to reach the passenger releasing position. Similarly, when the door state change detecting means 3 detects the fact that the vehicle door 2 is changed from the opening state to the closing state, the signal output regulating means 4 outputs the closing signal for the predetermined time. When the closing signal is input, the webbing driving means 5 drives the webbing 6 from the passenger releasing position to the passenger restraining position.

If the door state change detecting means 3 detects the fact that the vehicle door 2 is changed from the closing state to the opening state, when the impact detecting means 1 detects the impact signal, the signal output regulating means 4 immediately prohibits the opening signal from being output. As a result, the webbing driving means 5 stops driving the webbing 6. If the door state change detecting means 3 detects the fact that the vehicle door 2 is changed from the opening state to the closing state, when the impact detecting means 1 outputs the impact signal within the predetermined time, the signal output regulating means 4 immediately prohibits the closing signal from being output, so that the webbing driving means 5 stops the movement of the webbing 6.

Figure 4:
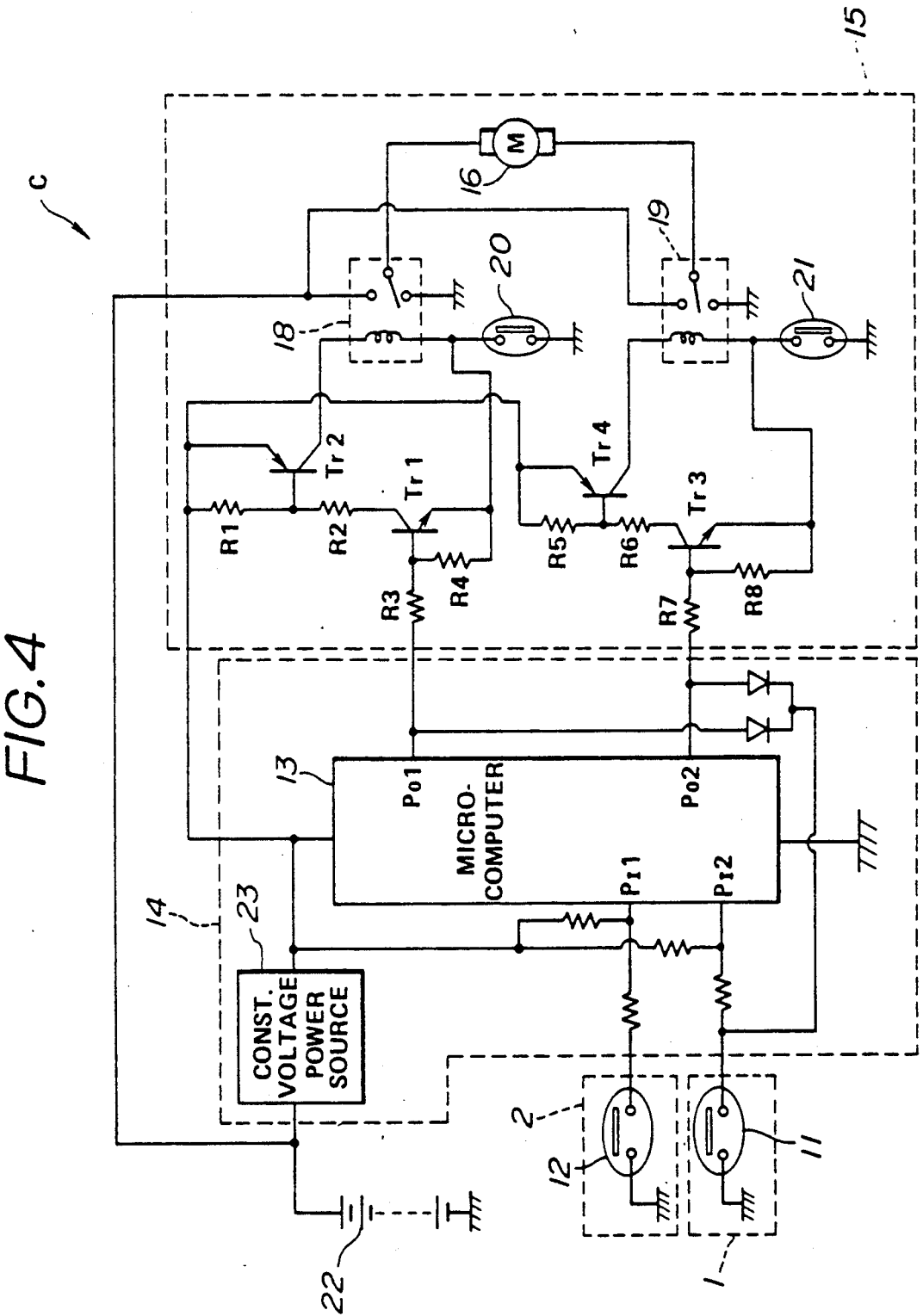
FIG. 4 is a circuit diagram showing an essential part of an embodiment of the passive seat belt system according to the present invention.

Next, an essential part, the control system C, of an embodiment of the passive seat belt system P according to the present invention will be discussed hereinafter with reference to FIG. 4.

The control system C of the passive seat belt system comprises a door switch 12 which is adapted to be turned ON when the vehicle door 2 is in the opening state and turned OFF when the door 2 is in the closing state. A relay switch 11 serving as the impact detecting means ("G" sensor) is provided to be turned ON when impact is applied to a vehicle (automotive vehicle) and turned OFF when no impact is applied to the vehicle. The door switch 12 and the relay switch 11 are electrically connected respectively to terminals $P_I1$, $P_I2$ of a microcomputer 13 serving as the door state change detecting means 3 and the signal output regulating means 4. The microcomputer 13 forms part of a circuit 14 and is provided with terminals $P_O1$, $P_O2$ through which the opening and closing signals are output. The circuit 14 is electrically connected to a webbing driving circuit 15 (the webbing driving means) for moving the webbing 6 from the passenger restraining position to the passenger releasing position and vice versa.

The webbing driving circuit 15 includes a motor 16 for driving the webbing 6. Relay switches 18, 19 are provided to control the supply of electric current to the motor 16. Four transistors Tr1, Tr2, Tr3, Tr4 and resistors R1, R2, R3, R4, R5, R6, R7, and R8 for voltage level regulation are connected between the relay switches 18, 19 and the microcomputer 13 of the circuit 14. A front limit switch 20 is provided to be turned ON when the webbing 6 is out of the passenger releasing position and turned OFF when the webbing 6 is in the passenger releasing position. Additionally, a rear limit switch 21 is provided to be turned ON when the webbing 6 is out of the passenger restraining position and turned OFF when the webbing 6 is in the passenger restraining position. The microcomputer 13 is electrically connected through a constant voltage power source 23 to a power source 22 for driving the motor 16.

The operation of the passive seat belt system of FIG. 4 will be discussed with reference to FIGS. 5 and 6.

Figure 5:
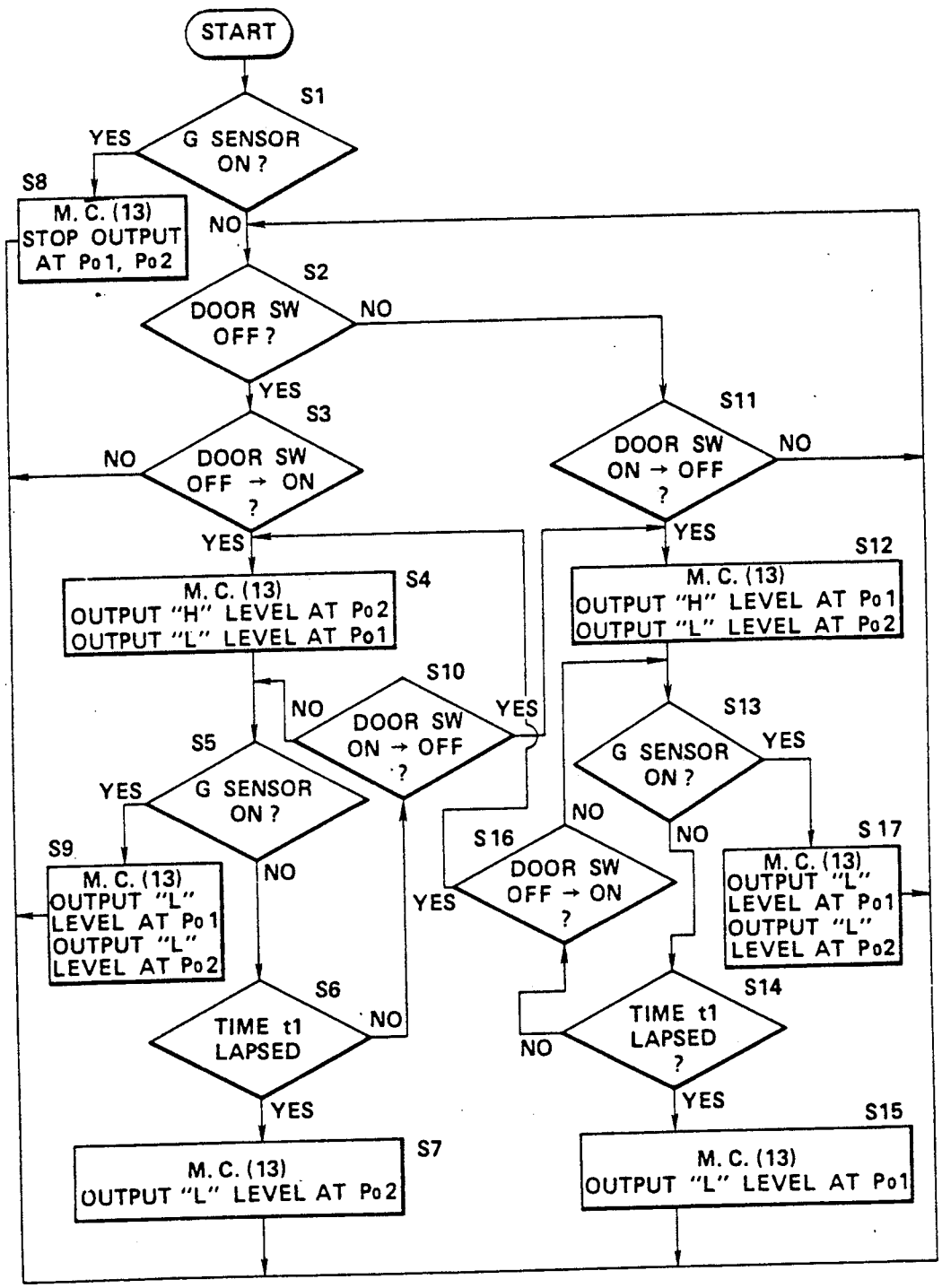
FIG. 5 is a flow chart illustrating the operation of the passive seat belt system of FIG. 4.
Figure 6:
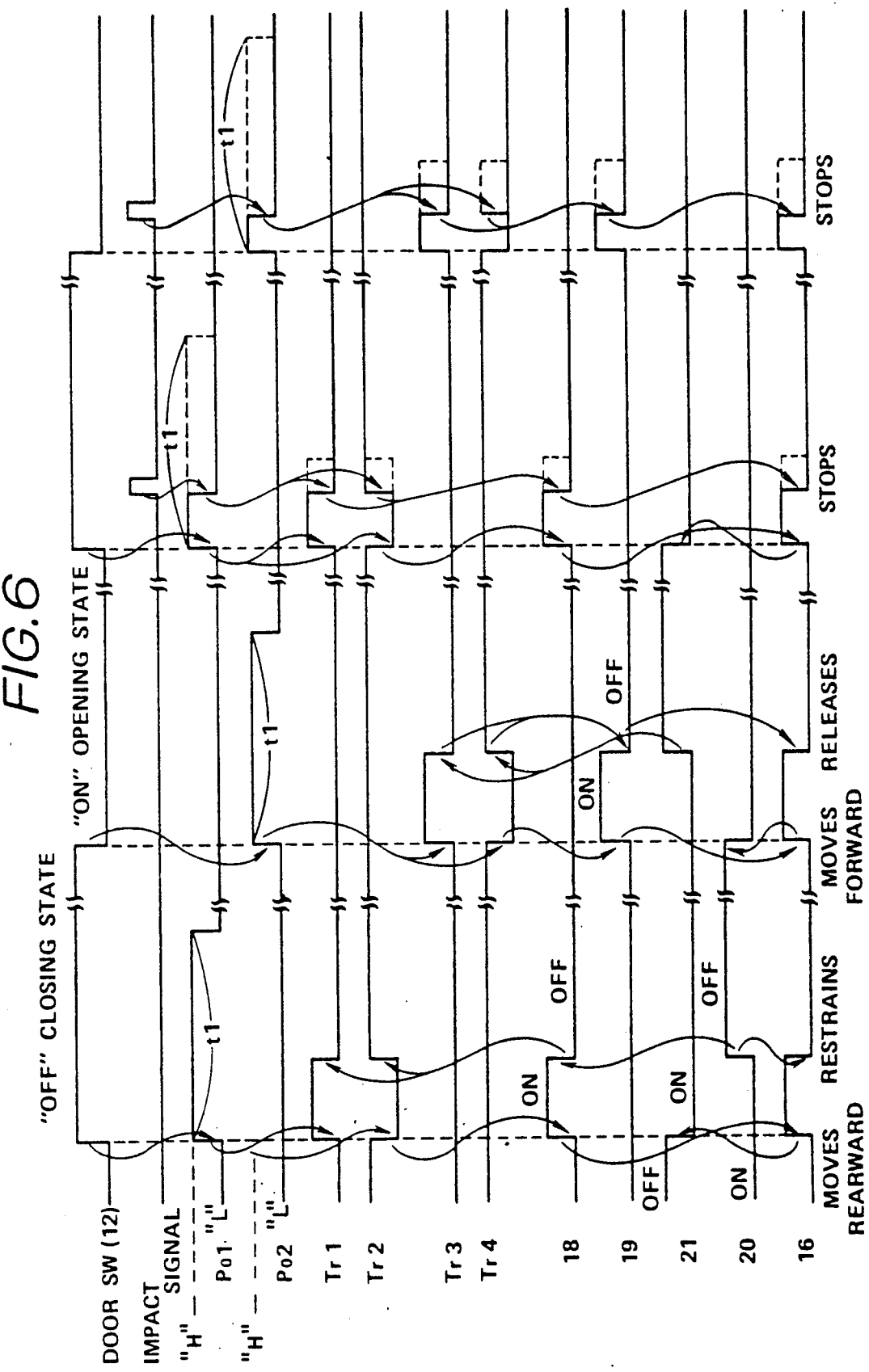
FIG. 6 is a timing chart illustrating the operation of the passive seat belt system of FIG. 4.

Referring to the flow chart of FIG. 5 showing the operation of the microcomputer 13, if judgment of no impact signal from the impact detecting means 1 ("G" sensor) is input at a step S1, when the vehicle door 2 is in the closing state, the door switch 12 outputs "H" level, signal as shown in FIG. 6, so that the vehicle door closing state is confirmed in response to the signal at a step S2.

When the circuit 14 including the microcomputer 13 as the door state change detecting means 3 detects the fact that the door switch 12 is changed from its closed state to the opened state at a step S3, the microcomputer 13, serving also as the signal output regulating means 4, of the circuit 14 outputs "L" level signal from the terminal $P_O1$ and "H" level signal from the terminal $P_O2$ at a step 4. At this time, if the judgment of no impact signal from the impact detecting means 1 is input at a step 5, the "H" level signal from the terminal $P_O2$ is maintained only for the above-mentioned predetermined time t1 as shown in FIG. 6. Here, the predetermined time t1 is longer than a time required to move the webbing from the passenger restraining position to the passenger releasing position. Since the "L" level signal from the terminal $P_O1$ is applied to the base of the transistor Tr1, an interruptive condition is established between the collector and the emitter of the transistor, so that the base voltage of the transistor Tr2 becomes at "L" level thereby putting the transistor Tr2 in the interruption condition. Since "H" level signal from the $P_O2$ is applied to the base of the transistor Tr3, a conductive condition is established between the collector and emitter of the transistor Tr3. Now if the vehicle door 2 is in the closing state, the webbing 6 is usually in the passenger restraining position, and therefore the front limit switch 21 is turned ON while the rear limit switch 20 is turned OFF as discussed above. As a result, "L" level signal is supplied to the base of the transistor Tr4, and consequently the transistor Tr4 comes into the conductive condition, so that the relay switch 19 is turned ON thereby driving the motor 16. This moves the webbing 6 from the passenger restraining position to the passenger releasing position. When the webbing 6 reaches the passenger restraining position, the front limit switch 21 is changed from ON state to OFF state as shown in FIG. 6, thereby making the motor 16 inoperative to stop the webbing 6.

Next, if the microcomputer 13 makes judgment that time t1 lapses at a step S6, output of the signal (as the opening signal) from the terminal $P_O2$ is stopped, and the signal from the terminal $P_O2$ becomes at "L" level at a step S7. If the relay switch 11 as the impact detecting means 1 detects impact at the steps S1 or S5, to output the impact signal within the above-mentioned predetermined time t1, the opening signal from the terminal $P_O2$ of the microcomputer 13 of the circuit 14 is immediately changed to the "L" level at steps S8 or S9, so that the webbing 6 stops. At a step S10, when the microcomputer 13 as the door state change detecting means 3 detects the fact that the vehicle door is changed from the opening state to the closing state, the program goes to step S12. The above-mentioned is a control mode in a vehicle door opened condition.

If the door switch 12 is judged as being in the opening state in the step S2, the program goes to the step 11, and the microcomputer 13 as the door state change detecting means 3 judges as to whether the door switch 12 is changed from the opening state to the closing state. When judgment of changing from the opening state to the closing state has been made, the microcomputer 13 as the signal output regulating means 4 of the circuit 14 outputs "H" level signal from the terminal $P_O1$ and "L" level signal from the terminal $P_O2$. Accordingly, the transistor Tr1 is brought into the conductive condition as shown in FIG. 6. Now, at the opening state of the door switch 12, the webbing 6 is normally in the passenger releasing position so that the rear limit switch 20 is turned ON. Accordingly, the base voltage of the transistor Tr2 becomes at "H" level, so that the conductive condition is established between the collector and the emitter of the transistor Tr2. This turns relay switch 18 ON thereby driving the motor 16, so that the webbing 6 is moved from the passenger releasing position to the passenger restraining position. When the webbing 6 reaches the passenger restraining position, the relay switch 18 is changed from the ON state to the OFF state as shown in FIG. 6, thereby stopping the webbing 6. If judgment of no impact signal from the relay switch 11 as the impact detecting means 1 is made at a step S13, judgment is made as to whether the time t1 has lapsed at a step S14. In case the time t1 has lapsed, the microcomputer 13 as the signal output regulating means 4 of the circuit 14 outputs "L" level signal from the terminal $P_O1$.

If the relay switch 11 as the impact detecting means 1 detects impact and outputs the impact signal at a step S13, the microcomputer 13 prohibits the "H" level signal from being output from the terminal $P_O1$ and outputs "L" level signal at a step S17, so that the transistors Tr1, Tr2 are changed from the conductive condition to the interruptive condition thereby putting the relay switch 18 OFF thus stopping the motor 16. This stops the movement of the webbing 6 to the passenger restraining position. If the microcomputer 13 as the door state change detecting means 3 detects the fact that the door switch 12 is changed from the closing state to the opening state at the step S16, the program immediately goes again to the step S4 so that the passenger can escape. The above-mentioned is a control mode in a vehicle door closed condition. Thus, according to this embodiment, the base voltage of the transistors Tr1 and Tr3 in the webbing driving means is directly changed into the grounding voltage by the impact detecting means, so that the webbing stops immediately when the impact detecting means detects impact of the vehicle.

What is claimed is:
1. A passive seat belt system for a vehicle, comprising:
 a webbing for restraining a vehicle passenger, said webbing capable of selectively taking a first position for restraining the passenger and a second position for releasing the passenger from restraint;

a first means for detecting impact of the vehicle and for outputting an impact signal;

a second means for detecting a change in closing and opening states of a vehicle door;

a third means for selectively outputting first and second signals for a predetermined time when said change is detected by said second means, and for prohibiting said first and second signals from being outputted when said impact signal is outputted from said first means; and a fourth means for moving said webbing to the first and second positions respectively in response to said first and second signals outputted from said third means.

2. A passive seat belt system as claimed in claim 1, wherein said fourth means includes a fifth means for preventing said webbing from continuously moving in the direction of one of said first and second positions even in response to one of said first and second signals which are output from said third means.

3. A passive seat belt system as claimed in claim 1, wherein said predetermined time is at least the time required to move said webbing from said first position to said second position.

4. A passive seat belt system as claimed in claim 3, wherein said predetermined time is longer than the time required to move said webbing from said first position to said second position.

5. A passive seat belt system as claimed in claim 1, wherein said third means includes a sixth means for outputting first and second signals respectively when said second means detects a change of the vehicle door from the opening state to the closing state, and when said second means detects a change of the vehicle door from the closing state to the opening state.

6. A passive seat belt system as claimed in claim 5, wherein said second means includes a door switch adapted to be turned ON to output said second signal and to be turned OFF to output said first signal.

7. A passive seat belt system as claimed in claim 6, wherein said first means includes a relay switch adapted to be turned ON to output said impact signal.

8. A passive seat belt system for a vehicle, comprising:

a webbing for restraining a vehicle passenger, said webbing capable of selectively taking a first position for restraining the passenger and a second position for releasing the passenger from restraint;

a first means for detecting impact of the vehicle and for outputting an impact signal;

a second means for detecting a door state change in closing and opening states of a vehicle door;

a third means for selectively outputting first and second signals for a predetermined time when said door state change is detected by said second means, and for prohibiting said first and second signals from being outputted when said impact signal is outputted from said first means, said third means including means for initiating output of said first and second signals in response to a door state change immediately after said impact signal is outputted; and a fourth means for moving said webbing to the first and second positions respectively in response to said first and second signals outputted from said third means.

9. A passive seat belt system for a vehicle, comprising:

a webbing for restraining a vehicle passenger, said webbing capable of selectively taking a first position for restraining the passenger and a second position for releasing the passenger from restraint;

a first means for detecting impact of the vehicle and for outputting an impact signal;

a second means for detecting a door state change in closing and opening states of a vehicle door;

a third means for selectively outputting first and second signals for a predetermined time when said door state change is detected by said second means, and for prohibiting said first and second signals from being outputted when said impact signal is outputted from said first means, said third means including means for initiating output of said first and second signals in response to a door state change made within said predetermined time, from a timing signal generated when said impact signal is outputted; and a fourth means for moving said webbing to the first and second positions respectively in response to said first and second signals outputted from said third means.

* * * * *